Feb. 5, 1929.
L. S. CHADWICK ET AL
1,701,460
LIQUID FUEL STOVE
Filed Aug. 2, 1926
9 Sheets-Sheet 5

Fig. 13

Patented Feb. 5, 1929.

1,701,460

UNITED STATES PATENT OFFICE.

LEE S. CHADWICK, OF SHAKER HEIGHTS, AND MARC RESEK, OF CLEVELAND HEIGHTS, OHIO, ASSIGNORS TO PERFECTION STOVE COMPANY, OF CLEVELAND, OHIO, A CORPORATION OF OHIO.

LIQUID-FUEL STOVE.

Application filed August 2, 1926. Serial No. 126,366.

This invention relates, in general, to improvements in liquid fuel stoves, particularly of the retort class wherein the lighter hydrocarbons are used as fuel, and wherein the fuel is fed by air pressure; and it has to do more especially with a removable fuel tank or reservoir for stoves of this class, and with the separable connections between the reservoir and the pipe or conduit that leads to the burners.

Heretofore, with stoves wherein the lighter and more volatile liquid hydrocarbon fuels, such as gasoline, are employed a hazard has attended the replenishing of the fuel supply because of the fact that the tanks or reservoirs are permanently connected to the stoves. In the filling of the reservoirs it almost invariably happens that some fuel is spilled, and in such close proximity to the stove that when the stove is relighted, if this is done before the spilled fuel has had time to thoroughly evaporate, the fuel is very liable to be ignited and a fire result therefrom.

With respect to that phase of our improvements in liquid fuel stoves which constitutes the subject matter of the present application, its primary purpose is to provide a stove of the aforesaid class wherein the fuel tank or reservoir is removable from the stove, and wherein the filling opening of the reservoir is accessible only when the reservoir is removed. This makes it necessary to actually take the reservoir off the stove for the purpose of filling it, and it is only natural that when the reservoir is so disconnected from the stove it will be taken to a safe place for filling. The removable reservoir thus obviates the danger above pointed out and at the same time provides the convenience afforded by the use of two or more reservoirs with each stove, permitting one or more of the reservoirs to be kept filled at all times so that to replenish the fuel supply requires only the removal of the empty reservoir and the substitution therefor of a full one.

A further purpose of the invention is to provide a quickly and conveniently detachable reservoir involving separable connections that are thoroughly fluid-tight when in effective condition, and which are of such nature that, in the removal of the reservoir, the air pressure within the reservoir is relieved before any appreciable separation occurs between the reservoir and the stove structure, thus avoiding the expulsion of any liquid fuel left in the tank; and which are of such character that, in the removal and replacement of the reservoir, there is no fuel emitting opening in the reservoir that is disposed below the maximum fuel level thereof.

Other and more specific objects of the invention will appear as this description proceeds, among which are the provision of relatively simple yet highly efficient, substantial and durable constructions for carrying out the foregoing purposes and that are especially convenient of use; also the utilization of the means employed for detachably connecting the reservoir to the stove as a handle for carrying the reservoir; and the provision of means for automatically closing one or both, the fuel line and reservoir, upon the removal of the reservoir from the stove.

In the accompanying drawings, wherein various embodiments of the invention are illustrated.

The stove frame or structure includes a top 1, end panels 2 and 3, and a shelf 4. The top is provided with openings 5 which are fitted with the usual grids 6.

A unit 10, in the form of a substantial casting, is secured by fastening means 11 to the end panel 2. At its outer end, the unit 10 is formed with a depending boss 12 that is surrounded by a groove 13, occupied by a washer 14 of suitable material. A passageway 15 extends through the unit 10 and establishes communication between a riser 16, comprised of a pipe which has its lower end screwed into the unit, and a tube 17 which has its upper end similarly fitted within the lower end of the boss 12. As will presently appear, the riser 16, passageway 15 and tube 17 constitute parts of the fuel supply line to the burners. The lower end of the tube 17 is fitted with a self closing valve 18 that is provided with a protruding pin 19. When the reservoir is in place, the valve 18 is held off its seat by the engagement of the pin 19 with the bottom of the reservoir.

The upper end of the riser 16 has connection with a fitting 20 that is shown as secured, through a lug 21 and fastening means 22, to the end panel 2. The fitting 20 has a passageway 25 that communicates at one end with the riser 16 and opens at its opposite end through a vertically disposed spud 26 that is surrounded by a groove 27, occupied by a suitable washer 28. Between the inlet and outlet ends of the passage way 25 is a tapered valve seat 30 wherewith a correspondingly shaped valve 31 cooperates. A portion of the stem 32 of said valve is threaded for cooperation with a threaded bore 33 of the fitting 20 so that by turning said stem by means of a hand wheel 34 that is applied to its outer end, the valve 31 may be adjusted toward and from the seat 30 thereby to control the passage of fuel through the passageway 25 from the riser 16. A suitable packing gland 35 closes the joint between the valve stem 32 and the outer end of the fitting 20.

Figure 1:
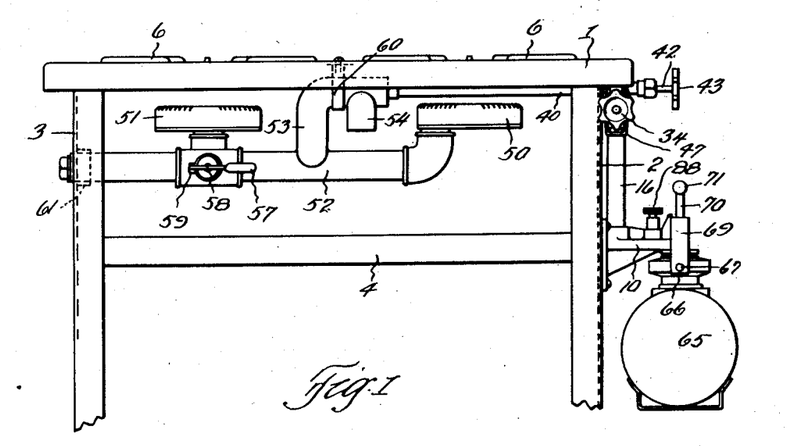
Fig. 1 is a partial front elevation, and Fig. 2 a plan view, of a stove incorporating our improvements.
Figure 2:
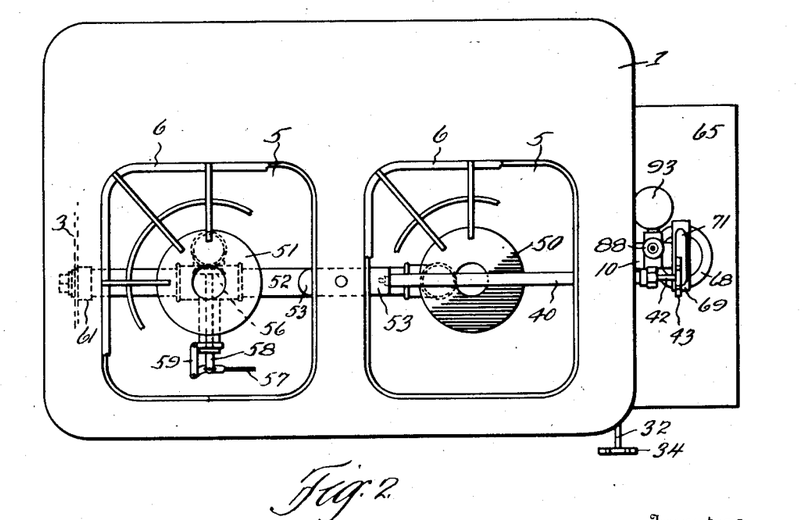
Figure 3:
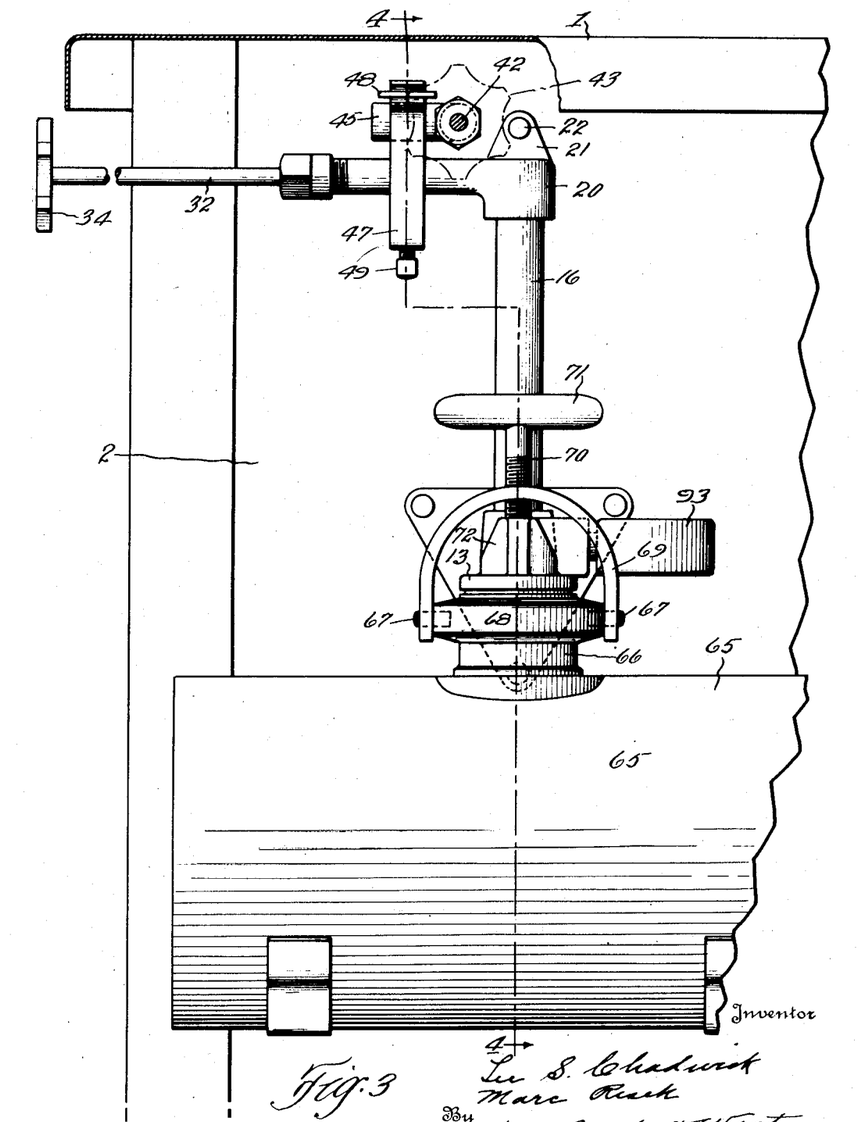
Fig. 3 is a fragmentary, enlarged right hand end elevation of the stove.
Figure 4:
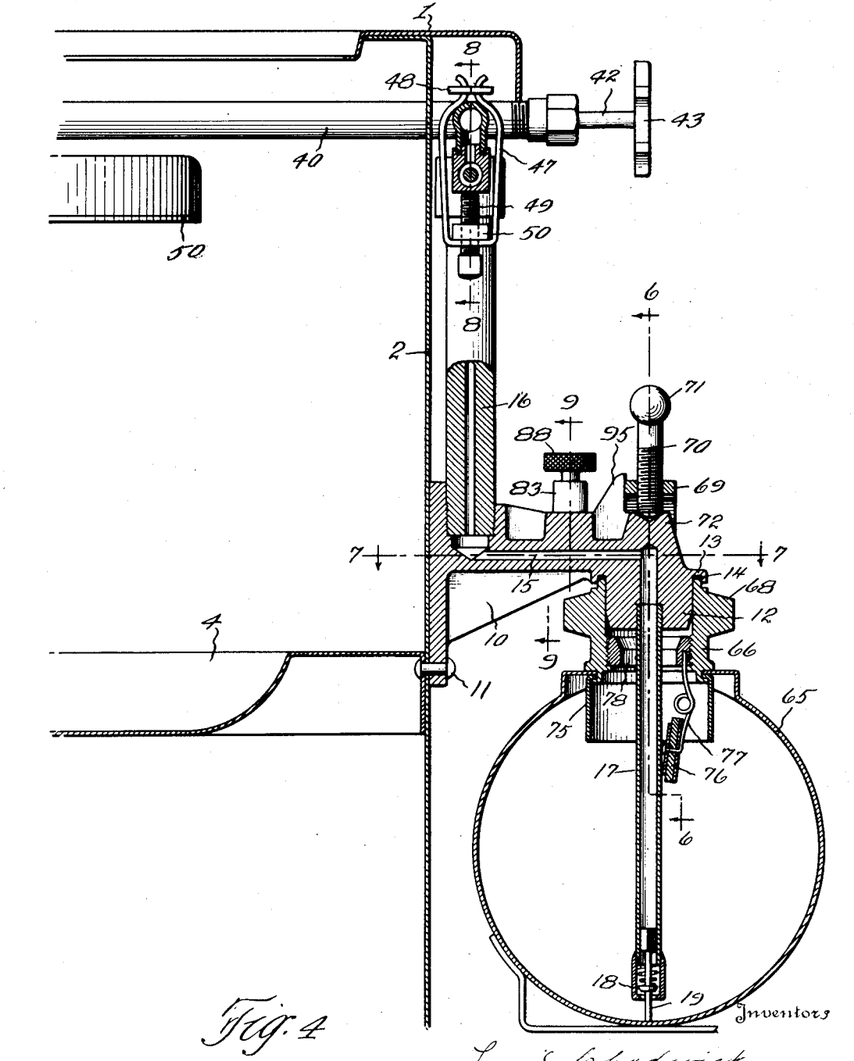
Fig. 4 is a vertical section on the line 4—4 of Fig. 3.
Figure 5:
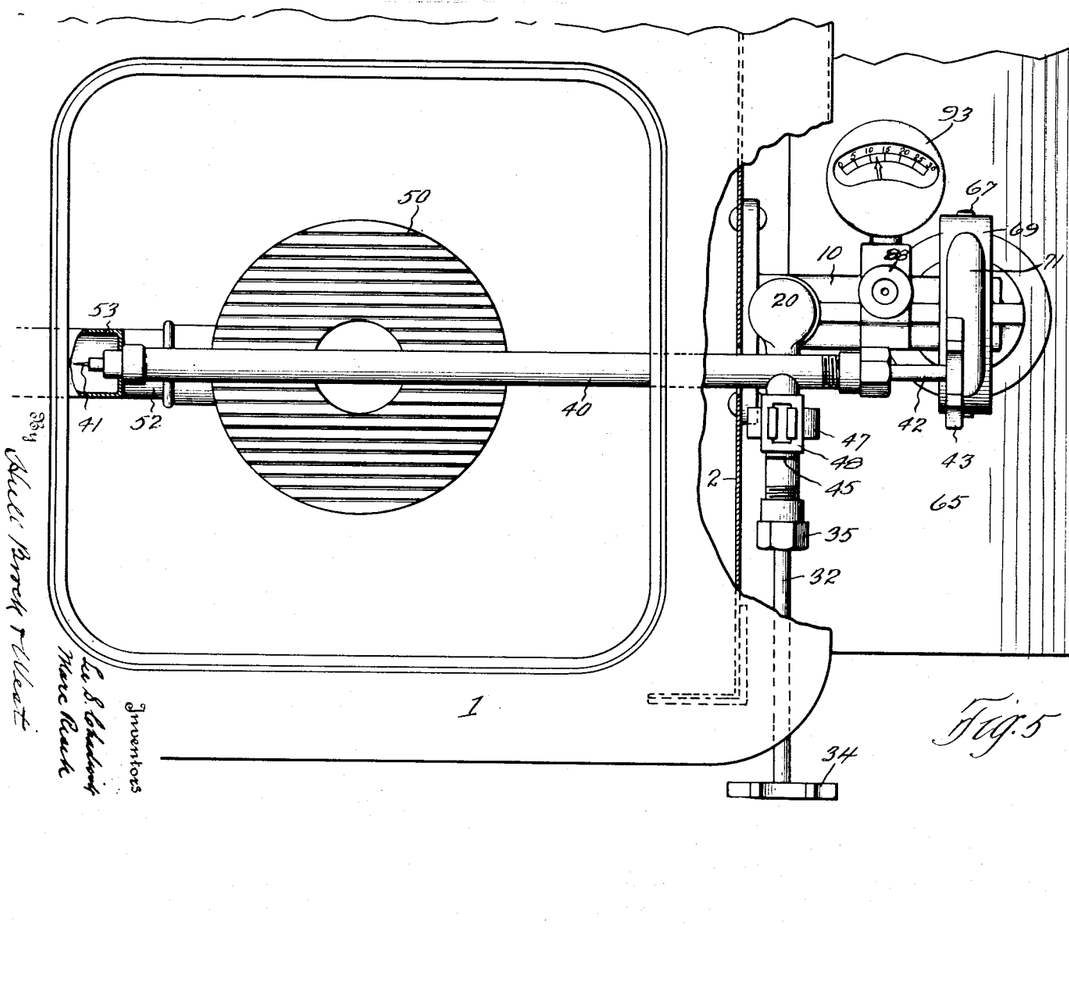
Fig. 5 is a fragmentary plan view of the stove.
Figure 6:
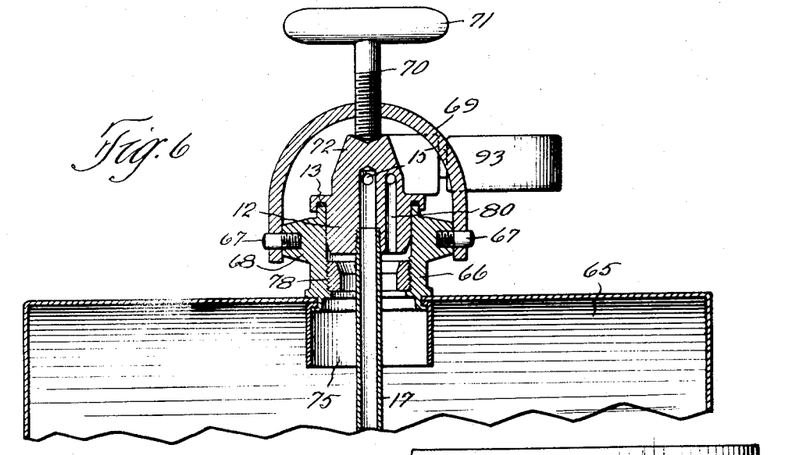
Figs. 6, 7, 8 and 9 are sectional details on the respective lines 6—6 to 9—9 of Fig. 4.
Figure 7:
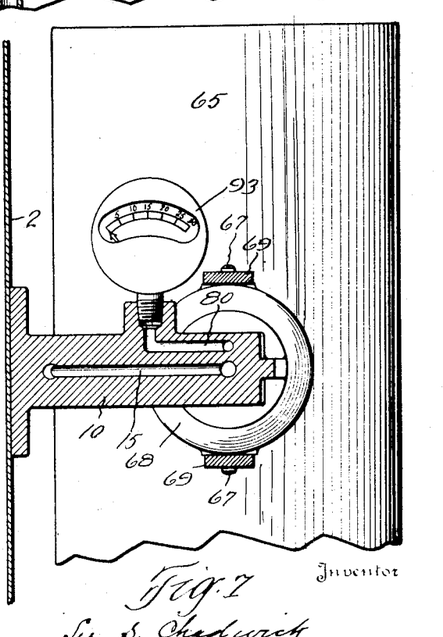

40 is a retort or vaporizer of the well known tubular type, and the same includes a needle valve 41 (Fig. 5), located adjacent its inner end and controlled through its stem 42 by a hand wheel 43 that is applied to the outer end of the stem. The retort or vaporizer is projected through an opening in the end panel 2 and outwardly beyond said panel is provided with a lateral branch 45 formed with a depending hollow boss 46 that is arranged to fit down over the spud 26 into the groove 27 and bear against the washer 28. These parts are detachably connected together with a leak-proof joint by a clamp 47, shown as formed of a U-shaped strap that has the deflected upper ends of its branches held together by a member 48. A screw 49 passes through an opening in the middle portion of the clamp and is threaded through a nut 49ª which bears upon the inner side of said middle portion, the end of the screw engaging the underneath side of the fitting 20. By virtue of this construction, when the screw 49 is tightened it will, through the intervention of the strap, draw the retort or vaporizer downwardly with its boss 46 firmly pressed against the washer 28. This style of connection (disclosed herein for priority purposes and which is to be made the subject of a divisional application) clearly facilitates the removal and replacement of the retort or vaporizer. The importance of this feature will be more fully appreciated when it is remembered that, in stoves of the class to which the invention relates, it is necessary to remove the vaporizers quite frequently for purpose of cleaning them.

Situated centrally of and beneath the openings 5 of the stove top are burners 50 and 51 which are supported by and communicate with a fuel supply pipe 52. Rising from the pipe 52, intermediate its connections with the burners 50 and 51, is an elbow 53 into the end of which the reduced end of the retort or vaporizer 40 projects, the end of the elbow being otherwise closed. An air intake branch 54 depends from the horizontal part of the elbow 53. Thus the elbow forms a mixing chamber for the vapor which issues from the retort 40 and the air which is drawn in through the branch 54, the mixture passing on through the pipe 52 to the burners. As will presently appear, the gas supply to the burner 50 is controlled by the valve 41 of the retort, while the gas supply to the burner 51 is governed by a valve 56 of usual type that is adapted to be adjusted toward and from its seat by a lever 57 that is connected to the outer end of the valve stem 58 and is pivoted to a bracket 59, carried by an extension of the valve casing. The unit comprised of the burners, fuel pipe and elbow 53 is suitably supported from the stove structure, as by a strap 60 that depends from the stove top, and a member 61 that is carried by the end panel 3.

A fuel reservoir 65, shown in the form of a cylindrical tank, is removably connected to the unit 10. The reservoir has a filling opening or mouth surrounded by a neck 66 which is designed to fit over the boss 12 and enter the groove 13. Pivotally connected at 67 to diametrically opposed parts of an enlargement 68 of the neck 66 is a bail 69 which has a screw 70 threaded through its central portion. A handle 71 forms the head of the screw 70. Above the boss 12 the unit 10 is formed with an abutment 72 the upper face of which is depressed to form a seat for the end of the screw 70. By turning the screw in an appropriate direction the reservoir 65 will be lifted through the intervention of the bail 69 thereby to press the upper end of the neck 66 firmly against the washer 14 and produce a fluid-tight joint between the reservoir and the unit 10.

A sleeve 75 depends from the top wall of the reservoir 65 about the inner end of the neck 66 and constitutes, in effect, an extension of the neck. The purpose of this is to prevent filling the reservoir above the approximate plane of the lower end of the sleeve, as will be readily understood. To guard against the contents of the reservoir splashing out through the neck when the reservoir is carried from place to place, I provide a flap valve 76 that is carried by a spring 77 secured to a ring 78 that is threaded into the inner end of the neck. When the reservoir is attached to the stove as shown in the drawing the tube 17 maintains the flap valve 76 in open position but, when the reservoir is removed from the stove, the spring 77 lifts the valve 76 and seats is against the inner end of the neck in an obvious manner.

Figures 8, 9:
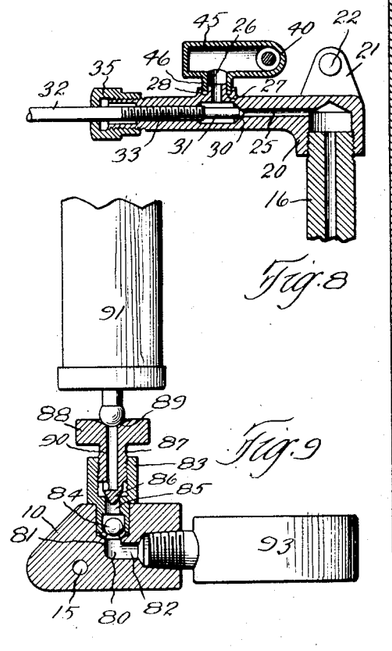

As previously stated, the liquid fuel in stoves of the class at hand is fed by air pressure. According to my present construction, air is introduced into the reservoir through a port 80 that is formed in the unit 10 and opens at one end through the bottom face of the boss 12 and joins at its opposite end branch ports 81 and 82 (Fig. 9). Within a counterbored portion of the branch 81 is pressed the reduced inner end of a fitting 83 which incorporates a ball check valve 84. The ball of this check valve is adapted to seat on a shoulder surrounding the inner end of the bore 85 of the fitting 83, while a valve 86 formed by the tapered inner end of a screw 87 is arranged to engage a shoulder surrounding the outer end of said bore. The screw 87 operates within the internally threaded enlarged outer end of the bore and is adapted to be manipulated by a head 88 which has a depression 89 in its outer end. A bore 90 leads in from the depression 89 through the shank of the screw and opens through the side of the screw adjacent the inner end thereof. The depression 89 is to facilitate the application of an air pump 91 to the bore 90. Communicatively connected to the branch 82 of the passageway 80 is an air gage 93.

When it is desired to introduce air under pressure into the reservoir 65, the screw 87 is fed outwardly by turning the head 88 until the valve 86 is withdrawn from its seat and the discharge end of the pump 91 is applied to the depression 89. The pump is now operated to force air through the bore 90 of the screw 87, past the ball check valve 84 and thence through the port 80 to the reservoir. The air pressure in the reservoir is indicated by the gage 93 which is in constant communication with the reservoir through the port 80 and its branch 82. Except when the pump is forcing air into the reservoir the ball check valve 84 is lifted by the air pressure against its seat to close the bore 85 of the fitting 83. When the desired air pressure has been attained as indicated by the gage 93, the pump is removed and the screw 87 is turned inwardly to positively close the bore 85 by the engagement of the valve 86 with the seat surrounding the outer end of said bore.

Preparatory to lighting the stove, the retort 40 is heated by playing thereon the flame of a suitable torch, and as soon as it is sufficiently hot to vaporize the fuel, the valves 31 and 41 are opened. This allows the fuel to flow under the influence of the air pressure within the reservoir, up through the pipe 17, through passageway 15, riser 16 and passageway 25, and through the retort where it is vaporized. The resultant vapor issues from the retort into the elbow 53 and mixes with air drawn in through the branch 55 of the elbow. The mixture then flows through the pipe 52 to the burner 50 and is lighted as it issues from the openings thereof. The flame of the burner is controlled by the valve 41, as will be readily understood, and said flame serves to maintain the vaporizer hot. To light the burner 51 it is only necessary to open the valve 56 by means of the handle 57 and apply a light to the burner; and to compensate for the gas of which the burner 50 has been robbed by the opening of the valve 56, the valve 41 of the retort may be opened further.

As the quantity of liquid fuel in the reservoir is depleted by the continued operation of either or both of the burners, additional air may be introduced into the reservoir by opening the valve 86 and using the air pump 91 as above described.

When it becomes necessary to replenish the fuel supply, the handle 71 which constitutes the head of the screw 70 is grasped and rotated in a direction to retract the screw with respect to the yoke 69. This allows the reservoir to drop with respect to the unit 10 and just as soon as the upper end of the neck 66 of the reservoir withdraws from the washer 14, the air pressure within the reservoir is relieved. Now, in case either or both of the burners were left in operation at the time the screw 70 is retracted, the release of the air pressure within the reservoir will result in the fuel ceasing to flow through the fuel line, thus insuring said burner or burners being extinguished before the reservoir is removed. When sufficient separation has occurred between the reservoir and unit 10 to enable the screw 70 to be disengaged from the abutment 72, the screw, with the bail 69, may be swung to one side and the reservoir lowered and removed from the tube 17. As the bottom of the reservoir withdraws from the protruding end of the pin 19 of the valve 18, said valve closes to trap within the fuel line any fuel that is present therein. As soon as the tube 17 withdraws from the neck of the reservoir the flap valve 76 seats against the neck as hereinbefore explained. To facilitate positioning the screw 70 with respect to the abutment 72, when the reservoir is applied to the stove, a stop 95 is provided against which the bail 69 engages. This stop is preferably formed integral with the unit 10. The handle 71 serves as a convenient means for carrying the reservoir.

Figure 10:
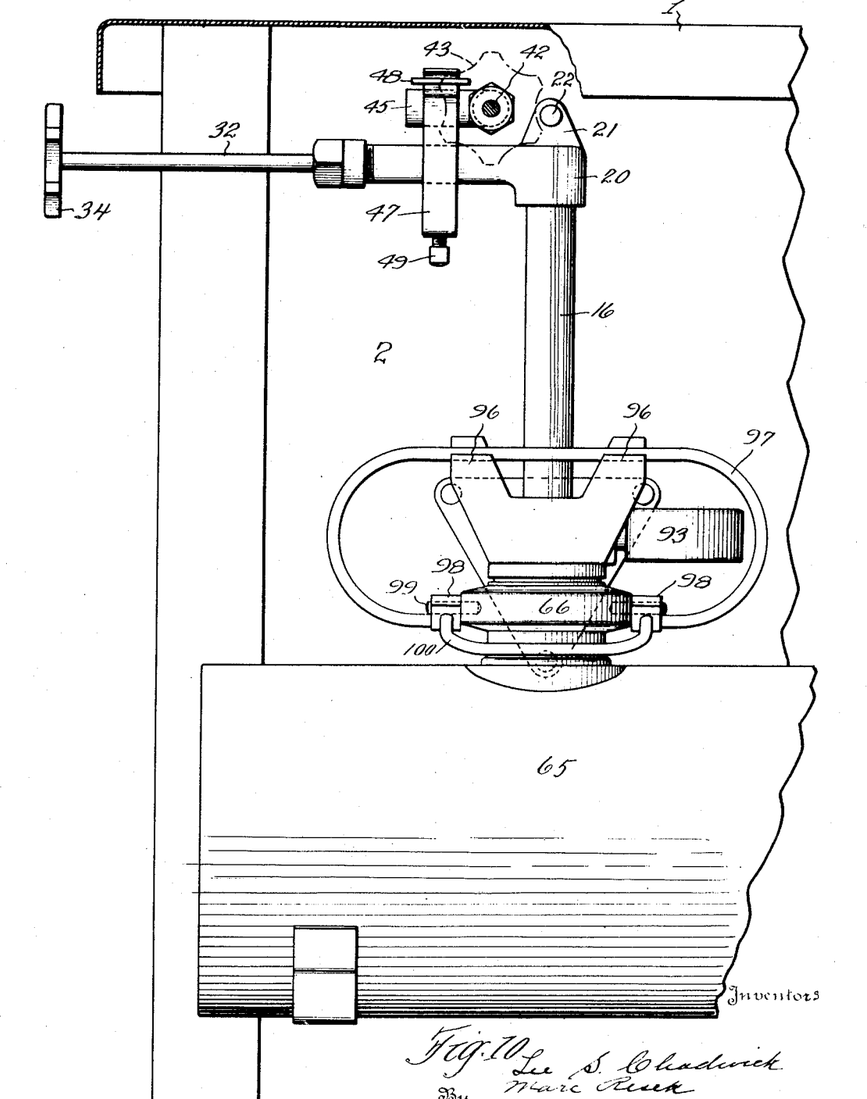
Figs. 10 and 11 are views similar to Figs. 3 and 4 of a modification of the invention.
Figure 11:
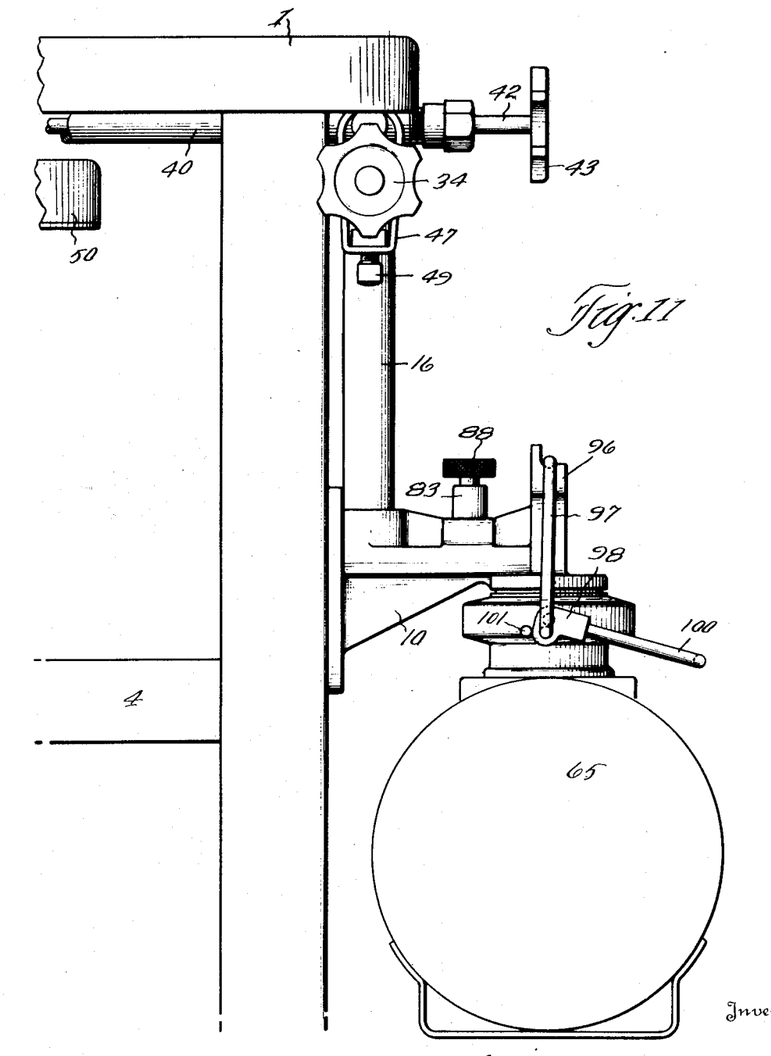

The form of the invention illustrated in Figs. 10 and 11 is identical in all respects with that above described excepting as to the means for connecting the reservoir to the unit 10. The same reference characters designate corresponding parts of the two modifications. In the form now to be described, the outer end of the unit 10 is provided with two laterally spaced apart ledges 96 whose upper surfaces are grooved to receive a bail 97 that is pivoted to blocks 98 disposed on opposite sides of the neck 66 of the reservoir 65. The blocks 98 are, in turn, pivotally connected through pins 99 to the neck and are adapted to be swung on their pivots by means of a yoke shaped lever 100 whose ends are fastened to said blocks. The connection between the bail 97 and the blocks 98 is eccentric with respect to the pivotal axes of said blocks, and when the blocks are swung to the position shown in Fig. 11, against a stop 101, the ends of the bail 97 are swung over center, so to speak, with respect to the axes of the blocks, and when the parts are in this position the bail 97 is under tension thereby to hold the neck of the reservoir firmly against the washer that is carried by the unit 10, as in the previously described embodiment. To remove the reservoir it is only necessary to swing the lever 100 up along side the bail 97 which results in the reservoir being dropped sufficiently to break the seal between the neck and the unit 10, allowing the air pressure in the tank to escape, and then by grasping both the lever and the bail, which is facilitated by the space between the ledges 96, the operator may lift the reservoir and disengage the bail from the ledges, after which the tank may be lowered and carried away by the bail for filling purposes, the bail thus serving as a handle for the reservoir.

Figure 12:
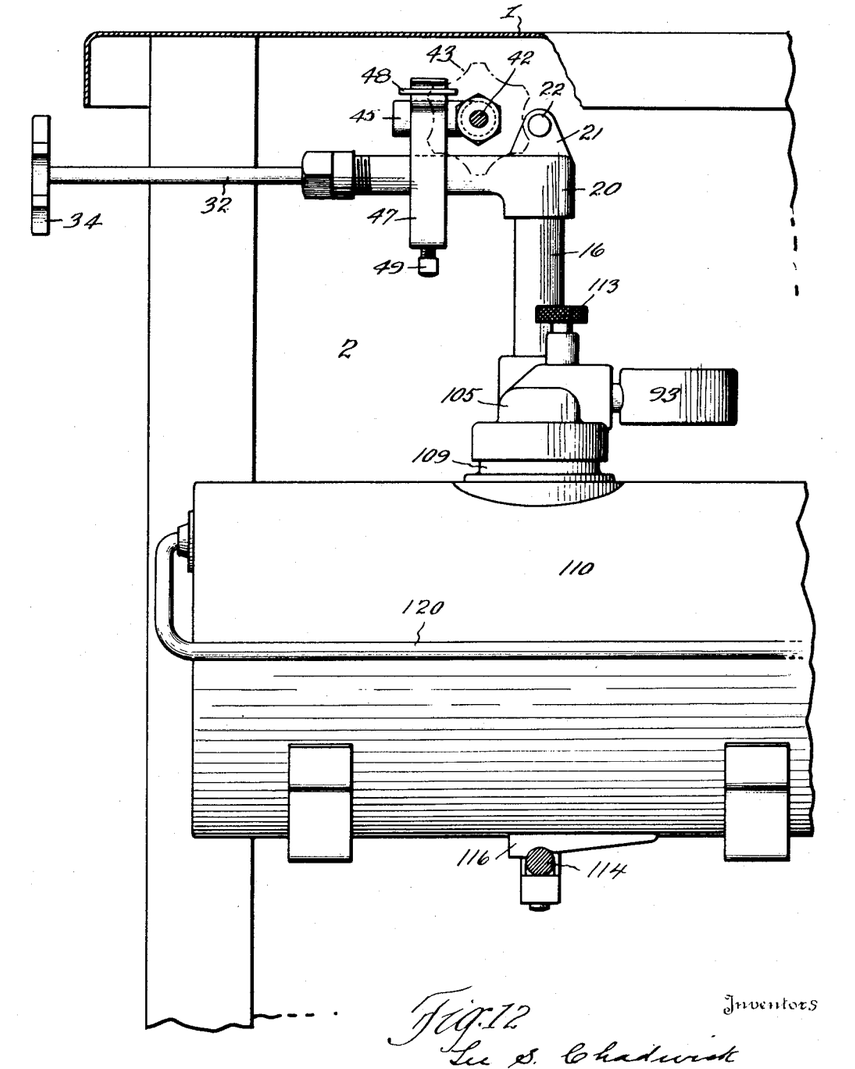
Figs. 12 and 13 are like views of a further modification.
Figure 13:
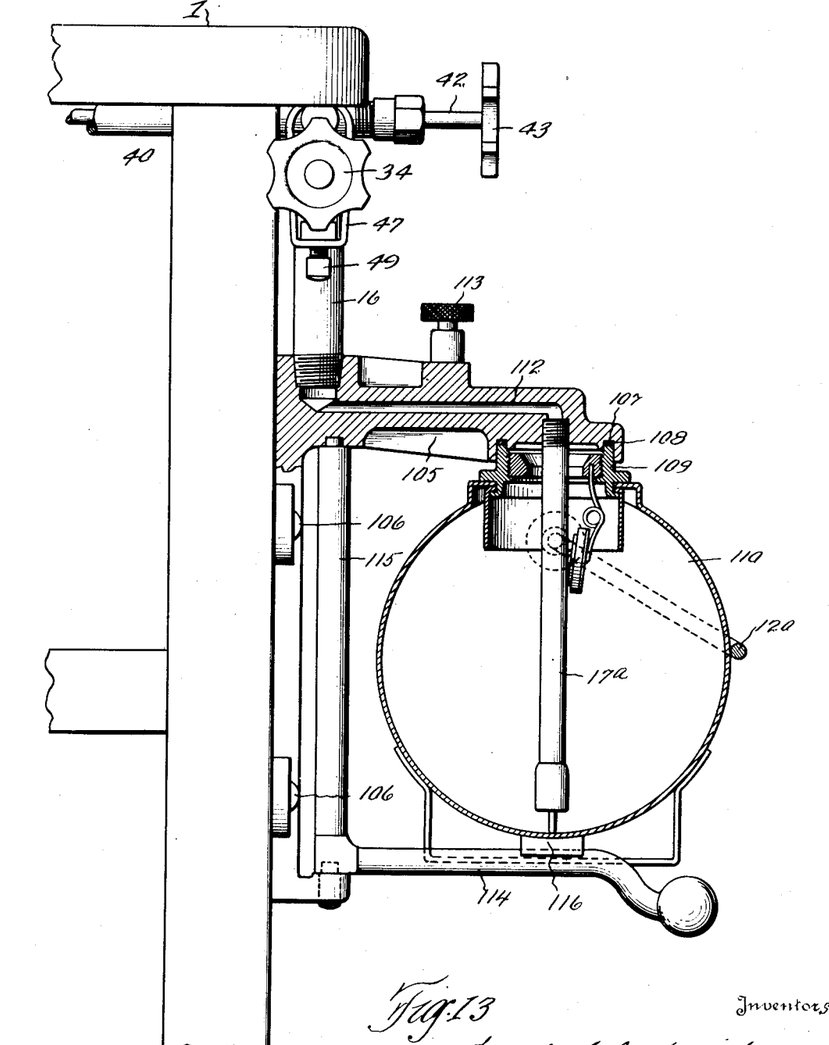

In the modification illustrated in Figs. 12 and 13, a bracket 105 is substituted for the unit 10, and the same is secured to the end panel 2 of the stove by suitable fastening means designated 106. The upper end of the bracket is formed somewhat like the unit 10 and on the underside of its outer end is a groove 107 containing a washer 108 for coopuration with the neck 109 of the reservoir 110. Depending from the bracket in concentric relation to the groove 107 is a tube 17ª, like the tube 17 of the first described form, and this tube communicates, through a passageway 112, with the riser 16. The bracket incorporates air passages similar to those of the preceding embodiments, there being a pump connection designated generally by the reference numeral 113 for introducing air into the reservoir. The reservoir is sustained by an arm 114 shown as formed integral with a shaft 115 that is pivoted at its opposite ends to opposed portions of the bracket 105 and the arm is arranged to engage an abutment 116 that is secured to the bottom of the reservoir, said abutment being notched, as shown in Fig. 12, for the reception of the arm 114 so as to prevent accidental dislodgment of the arm.

The tank is equipped with a bail 120, and when it is desired to remove the tank the bail is swung upwardly and held in a vertical position and the arm 114 is disengaged from the abutment 116 and swung to one side when the tank may be dropped away from the bracket 105 and removed. In this case, just as soon as the arm 114 is swung to one side, the seal between the tank and the bracket 105 is broken so that the air pressure within the tank may escape.

Having thus described our invention, what we claim is:—

1. In a liquid fuel stove of the class described, the combination of a fuel conduit leading to the burner, a portable reservoir requiring detachment from the stove for filling, means through which the reservoir is detachably and communicatively connected to the fuel conduit with a fluid-tight joint, and provisions for introducing air under pressure into the reservoir.

2. In a liquid fuel stove of the class described, the combination of a fuel conduit leading to the burner, a portable reservoir requiring detachment from the stove for filling, means through which the reservoir is detachably and communicatively connected to the fuel conduit with a fluid-tight joint, provisions for introducing air under pressure into the reservoir, and means for releasing the air pressure and removing the reservoir.

3. In a liquid fuel stove of the class described, the combination of a fuel conduit leading to the burner, a portable reservoir requiring detachment from the stove for filling, means through which the reservoir is detachably and communicatively connected to the fuel conduit with a fluid-tight joint, and provisions for introducing air under pressure into the reservoir, said means being of such nature that the air pressure in the reservoir is relieved upon the initial operation of said means to disconnect the reservoir from the fuel conduit.

4. In a liquid fuel stove of the class described, the combination of a fuel conduit leading to the burner, a portable reservoir requiring detachment from the stove for filling detachably connected to the conduit with a fluid-tight joint above the maximum liquid level of the reservoir, and provisions for introducing air under pressure into the reservoir.

5. In a liquid fuel stove of the class described, the combination of a fuel conduit leading to the burner, a portable reservoir requiring detachment from the stove for filling detachably connected to the conduit with a fluid-tight joint above the maximum liquid level of the reservoir and communicating with the conduit through an extension of the latter that dips into the reservoir to the depth of the minimum liquid level of the latter, and provisions for introducing air under pressure into the reservoir.

6. In a liquid fuel stove of the class described, the combination of a fuel conduit leading to the burner and involving a reservoir supporting unit, a reservoir detachably supported by said unit and similarly connected to the conduit with a fluid-tight joint that is located above the maximum liquid level of the reservoir, and provisions incorporated in the aforesaid unit for introducing air under pressure to the reservoir.

7. In a liquid fuel stove of the class described, the combination with the stove structure and burner, of a fuel conduit leading to the burner, a portable reservoir removably supported by the stove structure and requiring detachment for filling, fluid-tight detachable communicative connections between the reservoir and said conduit, and provisions for introducing air under pressure into the reservoir.

8. In a liquid fuel stove of the class described, the combination with the stove structure and burner, of a fuel conduit leading to the burner, a portable reservoir having a filling opening, a closure surrounding the receiving end of the conduit, means detachably securing the reservoir to the stove structure with its filling opening engaged with said closure, and provisions for introducing air under pressure into the reservoir.

9. In a liquid fuel stove of the class described, the combination with a stove structure and burner, of a fuel conduit leading to the burner, a seat through which the receiving end of the conduit opens, a portable reservoir having a mouth, means for clamping the reservoir to said conduit with its mouth in fluid tight engagement with said seat, the reservoir requiring detachment from the stove for filling it through said mouth and provisions for introducing air under pressure into the reservoir.

10. In a liquid fuel stove of the class described, the combination of a fuel conduit leading to the burner, a portable reservoir requiring detachment from the stove for filling, and a handle for the reservoir through which the reservoir is detachably connected to the fuel conduit.

11. In a liquid fuel stove of the class described, the combination of a fuel conduit leading to the burner, a portable reservoir requiring detachment from the stove for filling, and a handle for the reservoir through which the reservoir is detachably connected to the stove structure in communication with the fuel conduit.

12. In a liquid fuel stove of the class described, the combination with the stove structure and burner, of a fuel conduit leading to the burner, a seat through which the receiving end of the conduit extends, a portable reservoir having a filling mouth, and a handle for the reservoir through which the reservoir is adapted to be clamped to said conduit with its mouth in engagement with said seat.

13. In a liquid fuel stove of the class described, the combination with the stove structure and burner, of a fuel conduit leading to the burner, a unit applied to the stove structure and having a seat through which the receiving end of the conduit opens, a portable reservoir having a filling mouth, and a handle for the reservoir through which the reservoir is adapted to be clamped to said unit with its mouth in engagement with said seat.

14. In a liquid fuel stove of the class described, the combination with the stove structure and burner, of a fuel conduit leading to the burner, a unit incorporated in the stove structure and having a seat through which the receiving end of said conduit leads, a portable reservoir having a filling mouth, a yoke pivotally connected to the reservoir and adapted to be engaged over a part of said unit for sustaining the reservoir with its mouth in operative relation to said seat, and means for clamping the reservoir and unit together through the intervention of said yoke thereby to effect a fluid-tight joint between the mouth of the reservoir and said seat, and provisions for introducing air under pressure into the reservoir.

15. In a liquid fuel stove of the class described, the combination with a stove structure and burner, of a fuel conduit leading to the burner, a unit incorporated in the stove structure and having a seat and a passageway which opens at one end through said seat and at the other end has connection with said conduit, a tubular extension communicating with the first mentioned end of said passageway, a portable reservoir having a filling mouth for application to said seat and through which said tubular extension projects, means for clamping the reservoir to said unit with its mouth in fluid tight engagement with said seat, and provisions for introducing air under pressure into the reservoir.

16. In a liquid fuel stove of the class described, the combination with the stove structure and burner, a portable reservoir requiring detachment from the stove for filling, a fuel conduit leading from the burner through the top of the reservoir to a point near the bottom thereof, a fluid-tight, quick detachable joint between the reservoir and the conduit, and means for introducing fluid under pressure into the reservoir.

17. In a liquid fuel stove of the class described, the combination with the stove structure and burner, a portable reservoir removably supported by the stove structure and requiring detachment from said structure for filling, a fuel conduit leading from the burner through the top of the reservoir to a point near the bottom thereof, a fluid-tight, quick detachable joint between the reservoir and the conduit, and means for introducing fluid under pressure into the reservoir.

18. In a liquid fuel stove of the class described involving a burner and a fuel conduit leading thereto, a portable reservoir removably supported by the stove structure in communication with the fuel conduit, said reservoir having a filling opening and requiring detachment from the stove structure for filling through said opening, means serving to close said opening when the reservoir is in position on the stove structure, and provisions for introducing air under pressure into the reservoir.

19. In a liquid fuel stove of the class described, a portable fuel reservoir having a filling opening, a fuel conduit leading through said opening to a point near the bottom of the fuel space in the reservoir, means to clamp said reservoir to the fuel conduit and seal said opening, and provisions for introducing air under pressure into the reservoir.

20. In a liquid fuel stove of the class described involving a burner and a fuel conduit leading thereto, a portable reservoir having a filling opening, the reservoir being applied to the fuel conduit by presenting the reservoir thereto with its filling opening projected over the receiving end of the conduit a sufficient distance to allow the conduit to dip into the fuel space of the reservoir, a quick detachable, fluid-tight joint between the filling opening of the reservoir and the conduit, and provisions for introducing air under pressure into the reservoir.

21. In a liquid fuel stove of the class described, a portable reservoir having a space to contain fuel and a space in communication therewith for containing air under pressure, a fuel conduit in communication with the fuel space, the reservoir having a filling opening in the air space, means to clamp said conduit to said reservoir whereby the conduit seals said opening, and provisions for introducing air under pressure into the reservoir.

22. In a liquid fuel stove of the class described, the combination with the stove structure and burner, of a fuel conduit leading to the burner, a seat incorporated in the structure and through which the receiving end of the conduit leads, an abutment associated with said seat, a portable reservoir having a mouth for application to said seat, a bail pivoted to the reservoir and adapted, when the mouth of the reservoir engages said seat, to extend over said abutment, and a screw threaded through the bail for engagement with the abutment.

23. In a liquid fuel stove of the class described, the combination with the stove structure and burner, of a fuel conduit leading to the burner, a seat incorporated in the structure and through which the receiving end of the conduit leads, an abutment associated with said seat, a portable reservoir having a mouth for application to said seat, a bail pivoted to the reservoir and adapted, when the mouth of the reservoir engages said seat, to extend over said abutment, and a screw threaded through the bail for engagement with the abutment, said screw incorporating a handle for carrying the reservoir.

24. In a liquid fuel stove of the class described, the combination with the stove structure and burner, of a fuel conduit leading to the burner, a portable reservoir adapted to be detachably secured to the stove structure in communication with said conduit, and a bail on said reservoir through which the reservoir is so secured to the stove structure.

25. In a liquid fuel stove of the class described, the combination with the stove structure and burner, of a fuel conduit leading to the burner, a seat incorporated in the structure and through which the receiving end of the conduit leads, an abutment associated with said seat, a portable reservoir having a filling mouth for application to said seat and requiring detachment from the stove structure for filling through said mouth, and a bail pivoted to the reservoir for cooperation with the aforesaid abutment and through which the reservoir is clamped in place with its mouth against said seat.

26. In a liquid fuel stove of the class described, the combination with the stove structure and burner, of a fuel conduit leading to the burner, a seat through which the receiving end of the conduit leads, an abutment associated with said seat, a reservoir having a mouth, a yoke-shaped lever pivoted to the reservoir on opposite sides of its mouth, and a bail pivoted to said lever on an axis that is eccentric with respect to the pivotal axis of the lever, the bail being adapted to engage the aforesaid abutment thereby to clamp the reservoir in place with its mouth against said seat when said lever is swung in a direction to throw the axis of said bail over center with respect to the axis of the lever.

In testimony whereof, we hereunto affix our signatures.

LEE S. CHADWICK.
MARC RESEK.